(12) United States Patent
Debbins et al.

(10) Patent No.: US 11,269,557 B2
(45) Date of Patent: Mar. 8, 2022

(54) SYSTEM AND METHOD FOR ENSURING COMMAND ORDER IN A STORAGE CONTROLLER

(71) Applicant: ATTO Technology, Inc., Amherst, NY (US)

(72) Inventors: Barry J. Debbins, Lancaster, NY (US); Derek R. Palmerton, West Seneca, NY (US); Sucharita Sriram, Getzville, NY (US)

(73) Assignee: ATTO Technology, Inc., Amherst, NY (US)

( * ) Notice: Subject to any disclaimer, the term of this patent is extended or adjusted under 35 U.S.C. 154(b) by 0 days.

(21) Appl. No.: 16/938,191

(22) Filed: Jul. 24, 2020

(65) Prior Publication Data

US 2021/0011662 A1    Jan. 14, 2021

Related U.S. Application Data

(63) Continuation-in-part of application No. 16/806,681, filed on Mar. 2, 2020, now abandoned.
(Continued)

(51) Int. Cl.
*G06F 3/06* (2006.01)
*G06F 13/42* (2006.01)

(52) U.S. Cl.
CPC ............ *G06F 3/0659* (2013.01); *G06F 3/061* (2013.01); *G06F 3/0679* (2013.01); *G06F 13/4221* (2013.01); *G06F 2213/0036* (2013.01)

(58) Field of Classification Search
CPC ...... G06F 3/0659; G06F 3/061; G06F 3/0679; G06F 13/4221; G06F 2213/0036;
(Continued)

(56) References Cited

U.S. PATENT DOCUMENTS 6,748,457 B2 * 6/2004 Fallon .................. G06F 3/0613
                                                              710/2
7,979,588 B1    7/2011 Tran et al.
(Continued)

OTHER PUBLICATIONS

Arragattu, "ISCSI performance for mobile appliances using intermediate target storage." In: Diss. Wichita State University, May 2009, Retrieved from <https://soar.wichita.edu/bitstream/handle/10057/2433/THESES2009SPRING_16.pdf?sequence=1>, entire document, US.
(Continued)

*Primary Examiner* — Todd L Barker
(74) *Attorney, Agent, or Firm* — Michael J. Berchou, Esq.; Harter Secrest & Emery LLP

(57) ABSTRACT

A novel storage router with an acceleration gate is disclosed. The storage router includes one or more network interfaces for receiving storage traffic and a hardware engine for processing data storage commands. The hardware engine transfers commands and data to target storage devices by means of more than one storage interface, the storage interfaces having unequal processing latencies. The hardware engine contains an acceleration gate for storing the number of outstanding commands to each storage interface on a per-target-device basis. If the target device is not idle, the hardware engine uses the acceleration gate count to automatically route commands to the lowest latency path with outstanding commands for the target device.

19 Claims, 12 Drawing Sheets

Write Operation Components with Fast and Slow Paths

Related U.S. Application Data

(60) Provisional application No. 62/917,977, filed on Jan. 9, 2019.

(58) Field of Classification Search
CPC ... G06F 30/331; H04L 69/163; H04L 69/161; H04L 47/19; H04L 67/1097; H04L 47/10; H04L 47/34; H04L 47/22; H04L 47/27; H04L 69/12
See application file for complete search history.

(56) References Cited

U.S. PATENT DOCUMENTS

| | | | |
|---|---|---|---|
| 8,099,474 B2 | 1/2012 | Thorpe | |
| 8,161,234 B2 | 4/2012 | Ooi | |
| 8,321,639 B2 | 11/2012 | Lund et al. | |
| 8,438,321 B2 | 5/2013 | Elzur et al. | |
| 8,601,086 B2 | 12/2013 | Pandya | |
| 8,958,440 B2 | 2/2015 | Elzur | |
| 9,021,146 B2 | 4/2015 | Ross et al. | |
| 9,021,228 B2 | 4/2015 | Dinkjian et al. | |
| 9,122,401 B2 | 9/2015 | Zaltsman et al. | |
| 9,509,771 B2 | 11/2016 | Abram et al. | |
| 10,165,051 B2 | 12/2018 | Pandya | |
| 10,771,255 B1 * | 9/2020 | Roth | H04L 9/083 |
| 2004/0148376 A1 | 7/2004 | Rangan et al. | |
| 2005/0246443 A1 | 11/2005 | Yao | |
| 2006/0230119 A1 * | 10/2006 | Hausauer | H04L 47/6265 |
| | | | 709/216 |
| 2006/0277383 A1 * | 12/2006 | Hayden | H04L 67/1097 |
| | | | 711/170 |
| 2007/0067497 A1 * | 3/2007 | Craft | H04L 69/32 |
| | | | 709/250 |
| 2007/0156974 A1 | 7/2007 | Haynes, Jr. | |
| 2008/0049753 A1 | 2/2008 | Heinze et al. | |
| 2010/0235465 A1 | 9/2010 | Thorpe | |
| 2012/0089694 A1 | 4/2012 | Pandya | |
| 2013/0311719 A1 | 11/2013 | Doedline, Jr. et al. | |
| 2014/0331001 A1 | 11/2014 | Liu et al. | |
| 2015/0046646 A1 * | 2/2015 | Elzind | G06F 3/0658 |
| | | | 711/114 |
| 2015/0201017 A1 | 7/2015 | Hrischuk et al. | |
| 2015/0281197 A1 * | 10/2015 | Smart | H04L 63/08 |
| | | | 726/6 |
| 2017/0031600 A1 * | 2/2017 | Kesavan | G06F 3/0665 |
| 2018/0150221 A1 | 5/2018 | Benisty et al. | |
| 2018/0165038 A1 | 6/2018 | Authement et al. | |

OTHER PUBLICATIONS

International Search Report and Written Opinion for PCT/US2020/043489, dated Oct. 13, 2020, entire document.

Colyer, A. (Won et al.), "Barrier-enabled IO stack for Flash storage," Feb. 28, 2018, retrieved from https://blog.acolyer.org/2018/02/28/barrier-enabled-io-stack-for-flash-storage/, entire document, US.

* cited by examiner

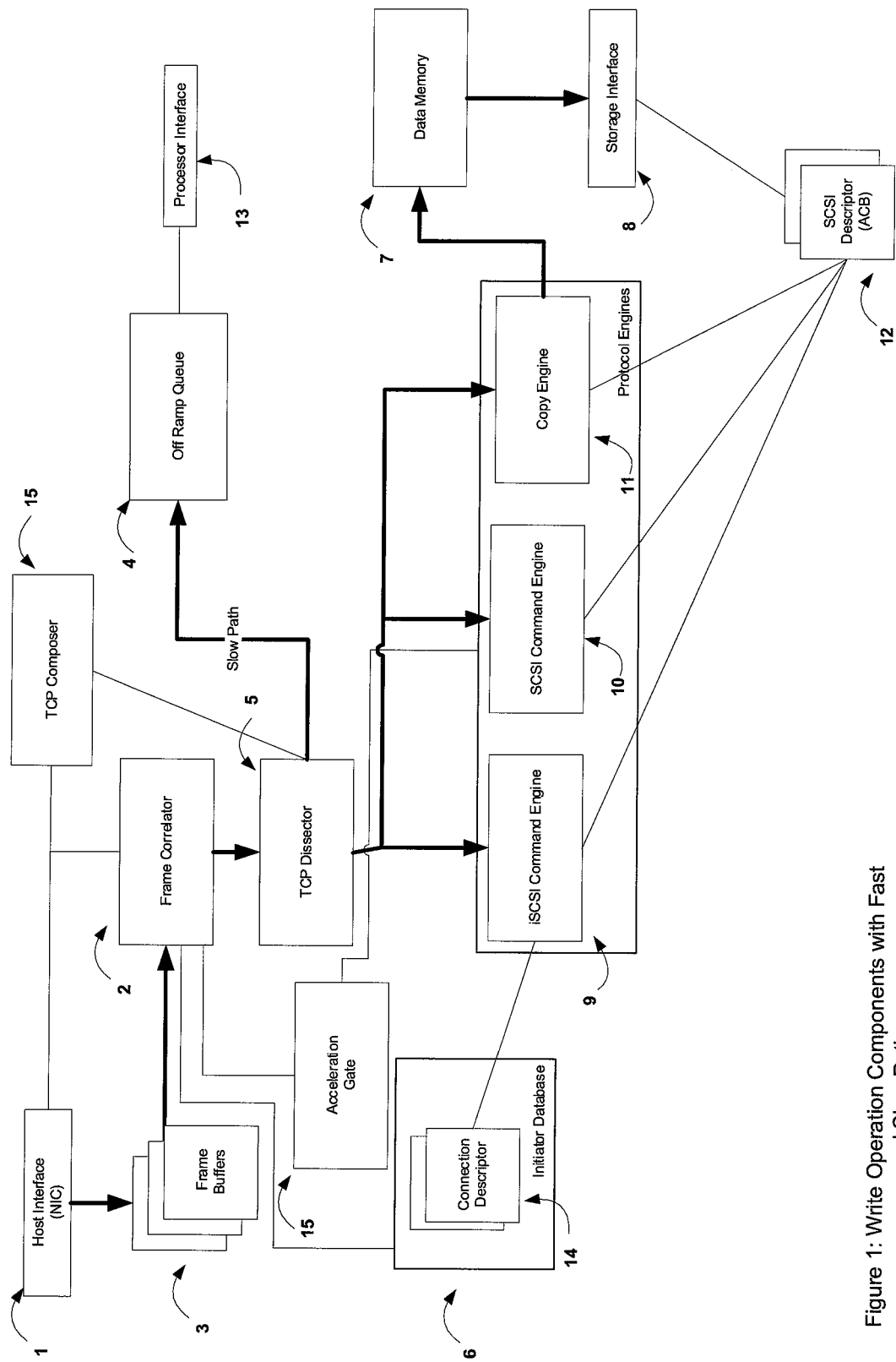
Figure 1: Write Operation Components with Fast and Slow Paths

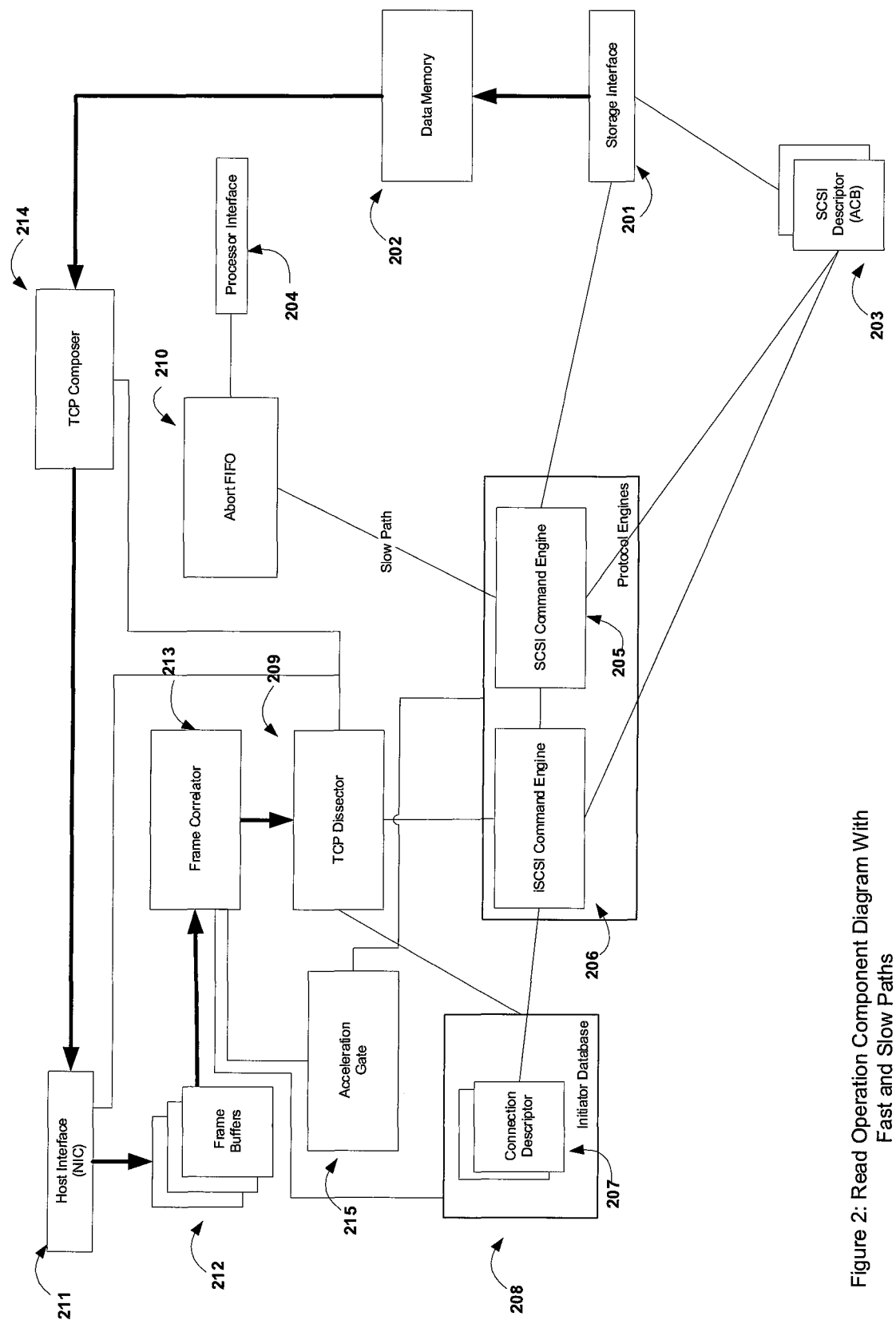
Figure 2: Read Operation Component Diagram With Fast and Slow Paths

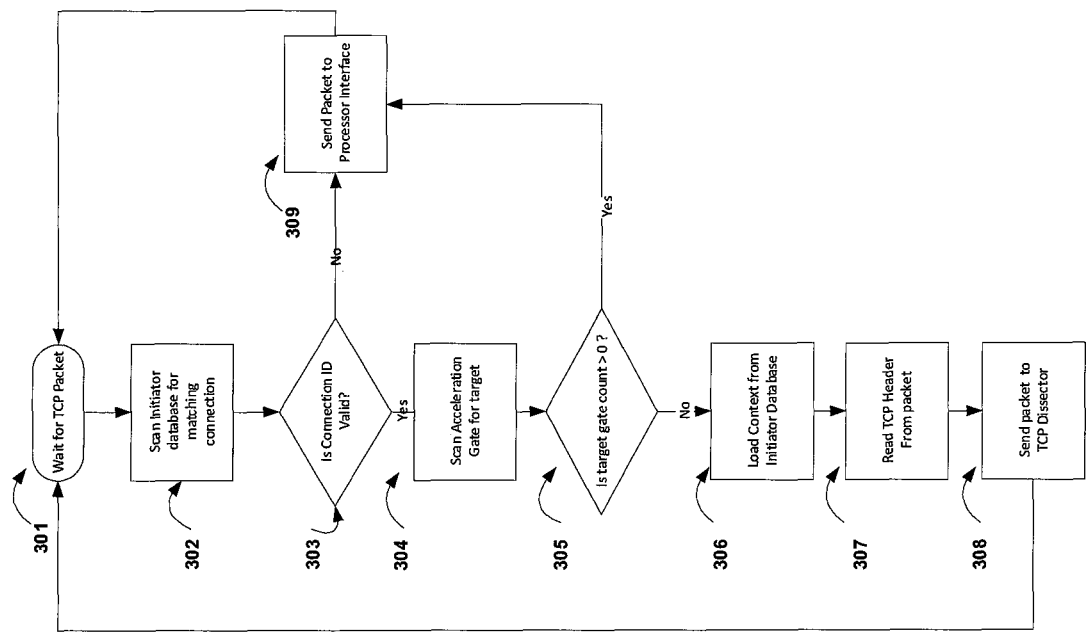
Figure 3: Frame Correlator With Acceleration Gate

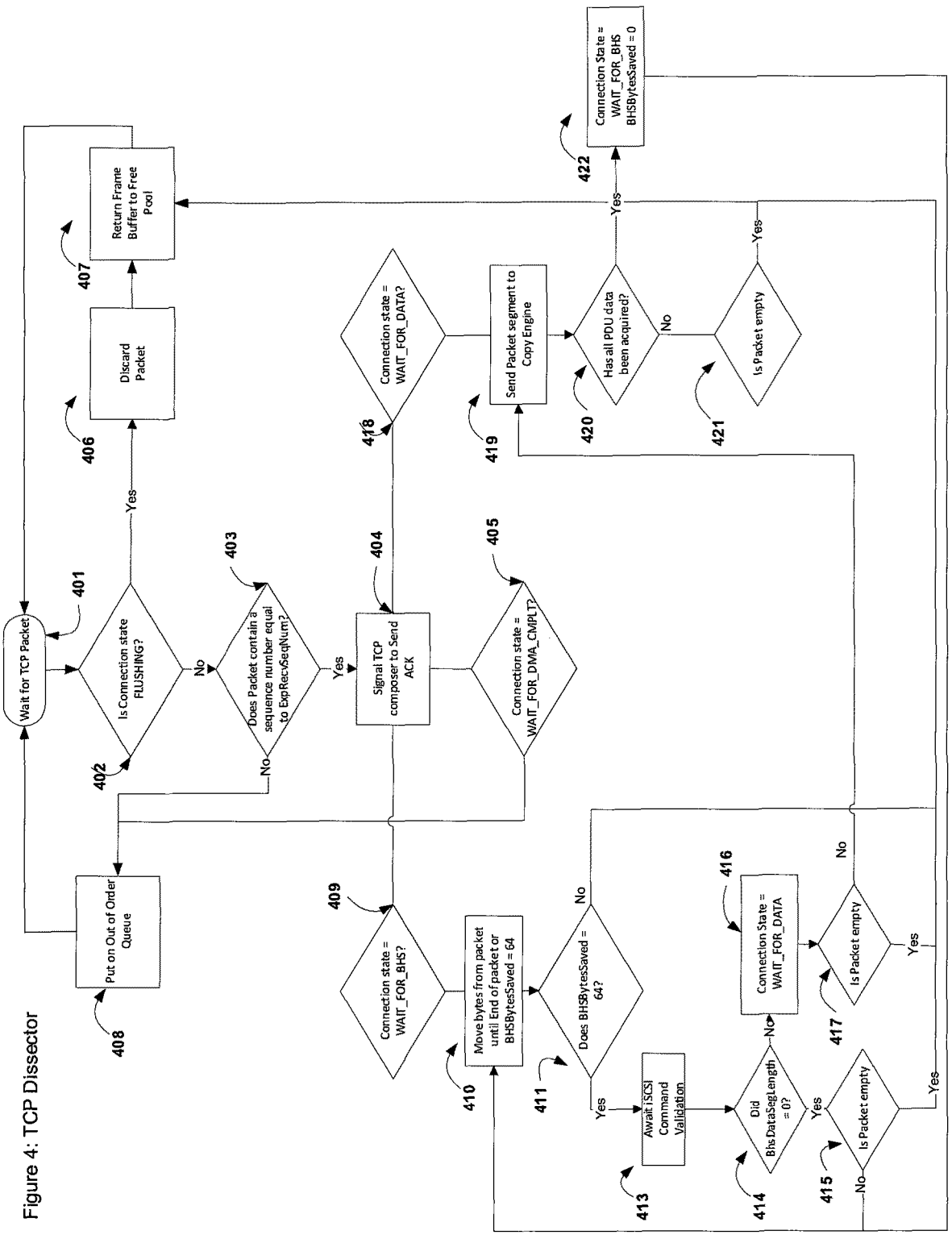
Figure 4: TCP Dissector

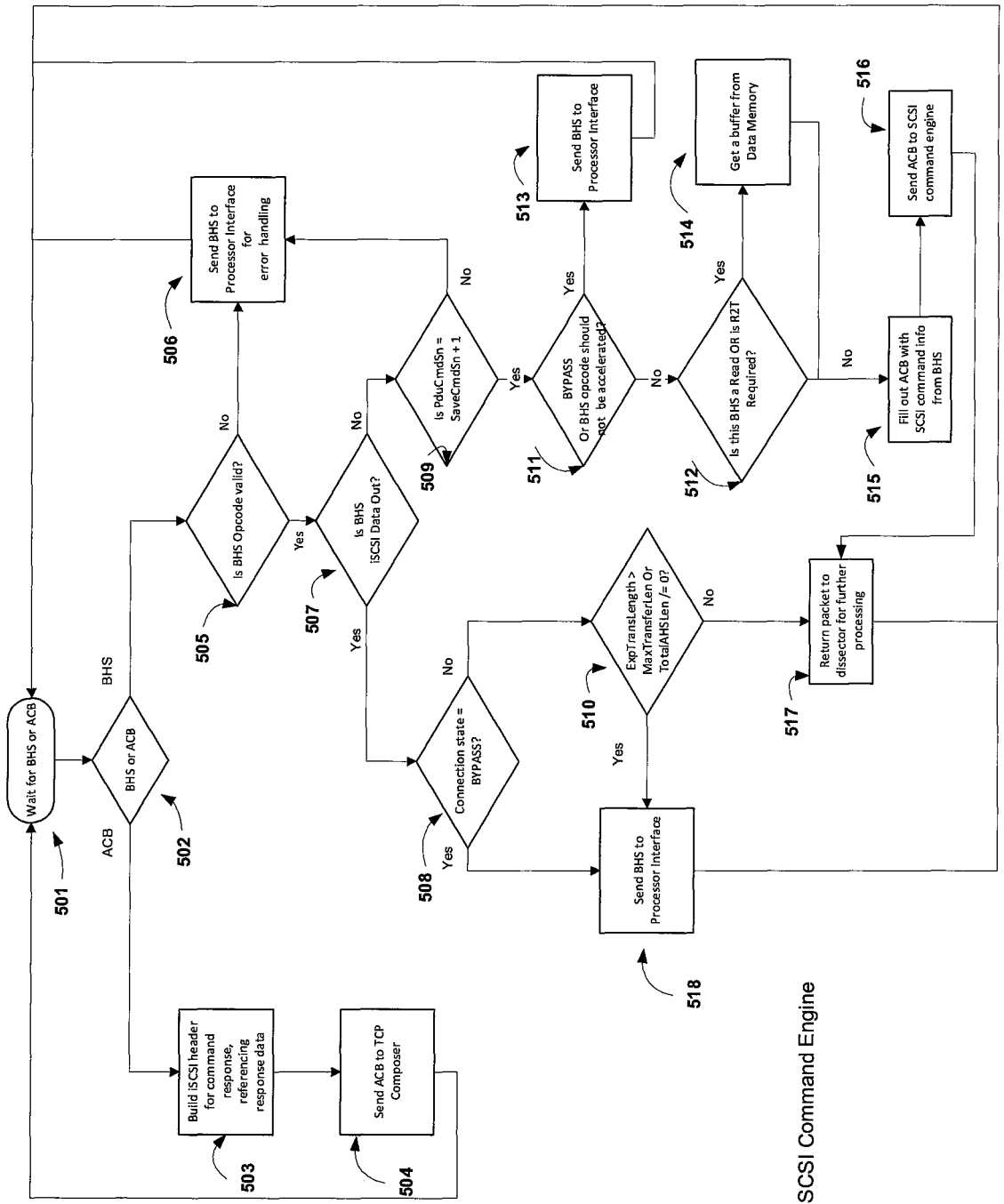
Figure 5: iSCSI Command Engine

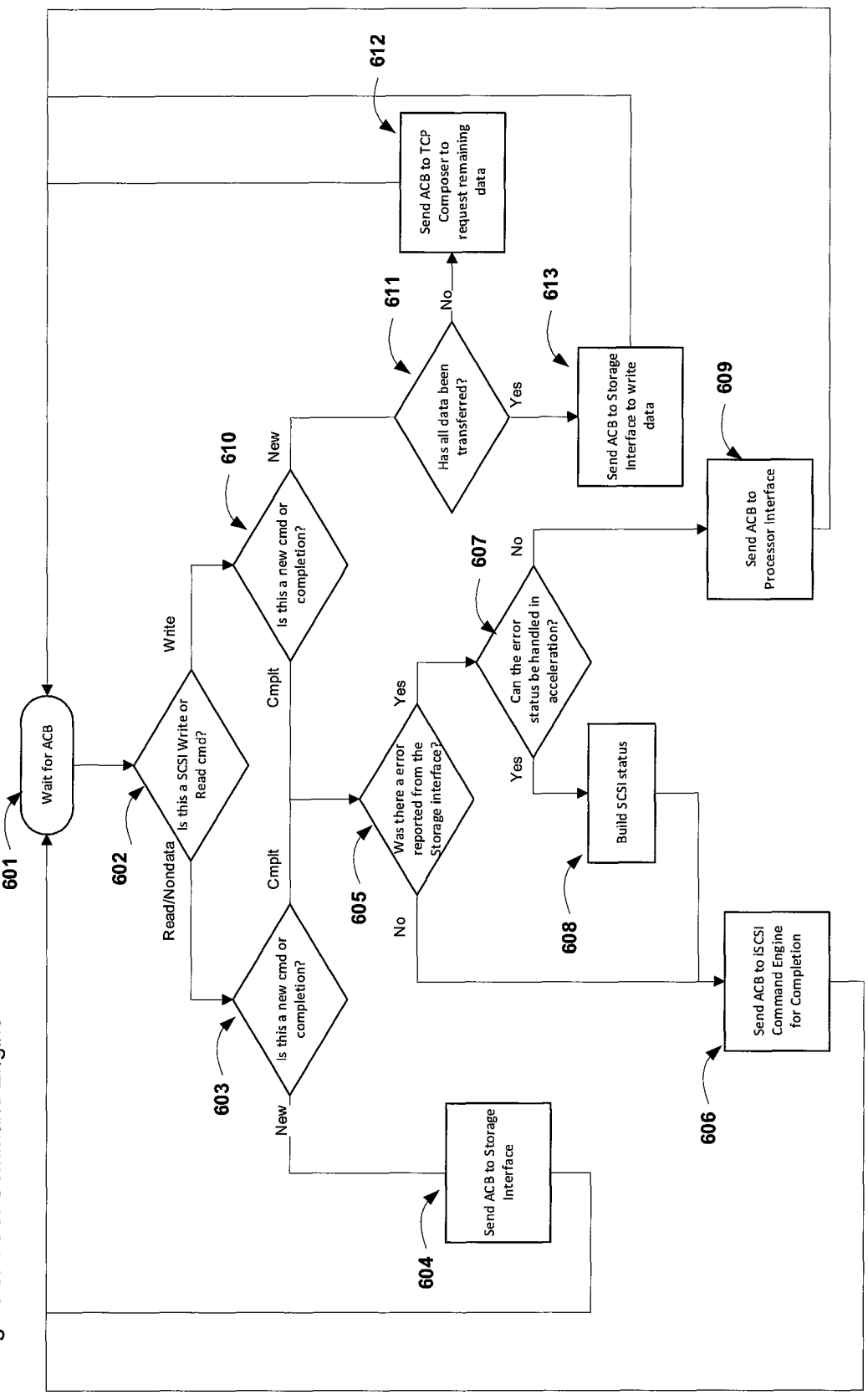
Figure 6: SCSI Command Engine

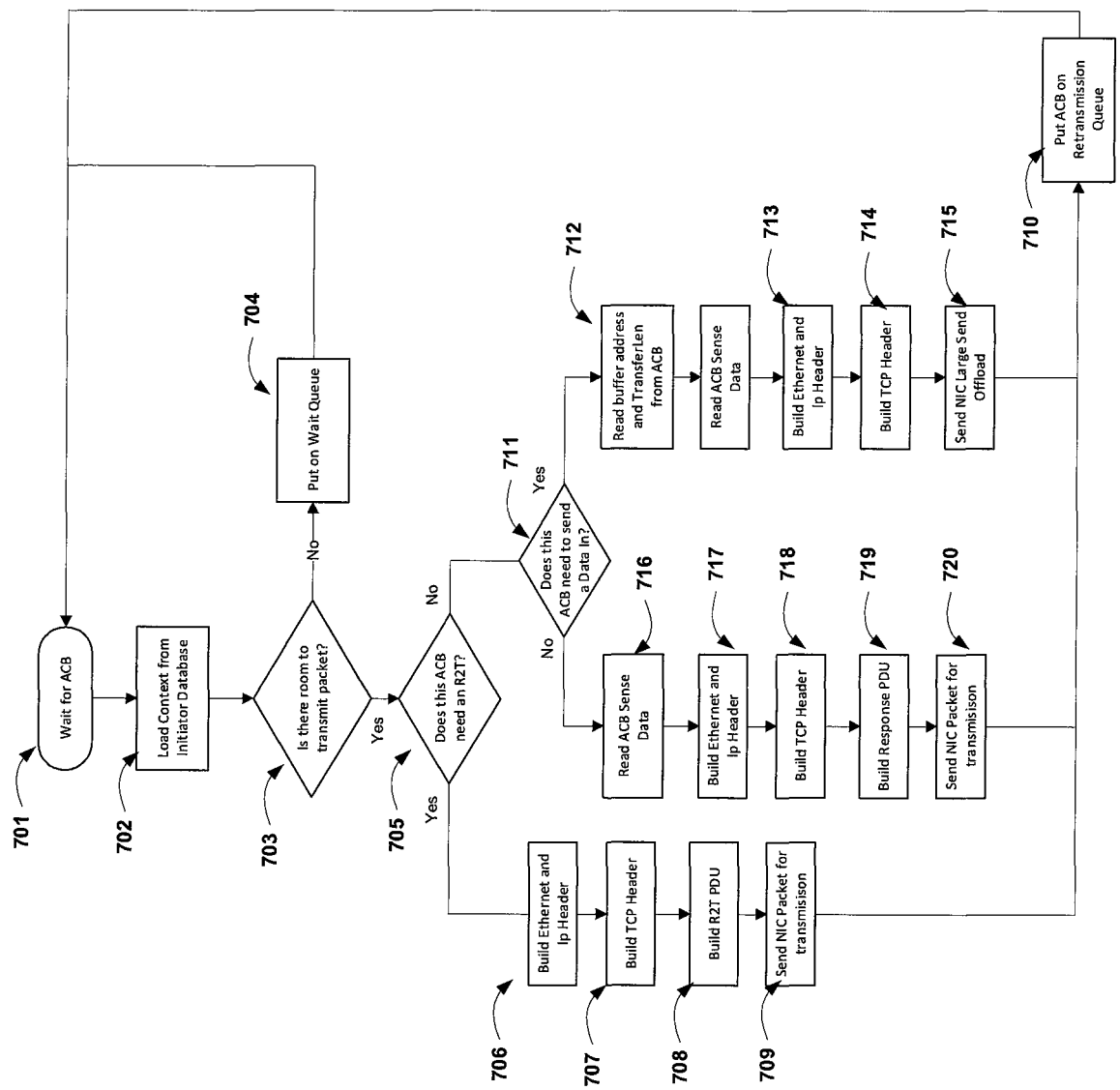
Figure 7 : TCP Composer

Figure 8 : Connection Descriptor

| Port Number | Queue Pair Number (QPN) | |
|---|---|---|
| | Connection State (ConnState) | |
| | SavedCmdSN | |
| | ExpStatSN | |
| | Initiator Task Tag (ITT) | |
| | BHS Bytes Saved (BhsBytesSaved) | |
| | Expected Receive Sequence Number (ExpRecvSeqNum) | |
| | MaxDataSegmentLength | |
| | TCP Source Port | |
| | IP Source Address | |
| | Received TCP ACK Number | |
| | Transmitted TCP Sequence Number | |
| | Immed/Opcode | RW/Attr | |
| | BhsTotalAHSLen | BhsDataSegLength | |
| | BhsLUN | BHS Cache |
| | BhsITT | |
| | BhsExpDataTransferLen/BhsTTT | |
| | BhsCmdSN | |
| | BhsExpStatSN | |
| | BhsCDB(3:0) | |
| | BhsCDB(7:4)/BhsDataSN | |
| | BhsCDB(11:8)/BhsBufferOffset | |
| | BhsCDB(15:12) | |

Figure 9: Connection States

| | |
|---|---|
| FLUSHING | Connection is no longer accepting packets, entered during connection teardown |
| WAIT_FOR_BHS | Connection is expecting bytes in stream to build BHS |
| WAIT_FOR_DATA | Connection is expecting bytes in stream transmitting application data |
| WAIT_FOR_DMA_CMPLT | Connection is not processing new packets until Copy Engine completes, used during error processing |
| BYPASS | Connection is not processing packets. All PDUs are sent to processor interface for handling. |

Figure 10: ACB

| Initiator Id | Flags | SCSI CDB | LUN | Command Direction (Read/Write/Non-data) | Inititator Task Tag (ITT) | Transfer Length | Byte Count | Buffer Address | Sense Data Length | Sense Data Buffer |
|---|---|---|---|---|---|---|---|---|---|---|

Figure 11: Acceleration Gate Data Storage

| Target Id (LUN) 0 | Gate Count |
| Target Id (LUN) 1 | Gate Count |
| ... | ... |
| Target Id (LUN) n | Gate Count |

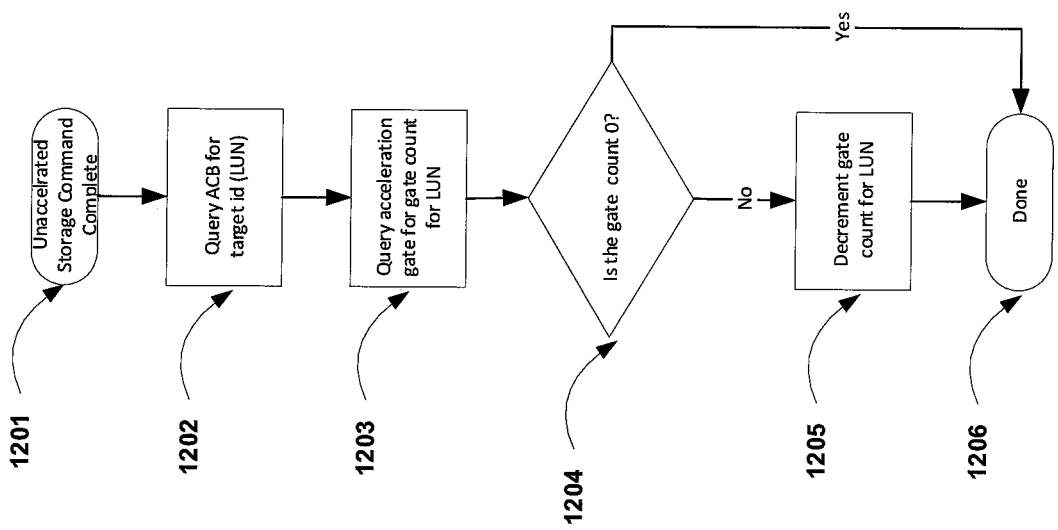
Figure 12: Storage Command Completion on High latency Path

SYSTEM AND METHOD FOR ENSURING COMMAND ORDER IN A STORAGE CONTROLLER

CROSS-REFERENCE TO RELATED APPLICATION

This application is a continuation-in-part of U.S. patent application Ser. No. 16/806,681, filed on Mar. 2, 2020, which claims the benefit of U.S. Provisional Application No. 62/917,977, filed on Jan. 9, 2019. Each of these earlier filed applications is hereby incorporated by reference in its entirety.

FIELD OF THE INVENTION

The present invention relates generally to the field of data storage devices, and more particularly to a data storage controller for handling multiple simultaneous storage commands.

BACKGROUND OF THE INVENTION

In a stand-alone computer, data is stored in a device such as a hard disk drive. This device is normally internal to the computer and is connected to the CPU by an internal bus. In a network environment, the data generated by a workstation may be stored on a remote device. Networks may comprise a large number of data storage targets such as disk drives, solid-state storage, optical storage and tape drives, connected to the storage network by a storage controller. The storage controller accepts storage commands and data for transfer between the storage network and the storage targets. These storage commands may be implemented according to the Small Computer System Interface (SCSI), Advance Technology Attachment (ATA) or NVM Express (NVMe) standards. Storage controllers may implement multiple concurrent command processing paths, each path capable of ingesting a number of commands and transferring data to the storage targets. Concurrent paths within a storage controller may be used to lower command latency or to provide load-balancing, redundancy and automatic failover within the storage system.

U.S. Pat. No. 9,509,771 (Abram et al.) relates to unequal command latencies. Abram teaches high, low and medium command queues within a management server whereby the processor component determines command priority based on command time sensitivity and command execution length.

While processing multiple simultaneous commands, situations arise in which command ordering must be maintained. Storage technologies like tape and optical disk transfer data in a single stream, requiring that commands be processed in the order received. Other storage systems may require strict command ordering due to the nature of the storage commands themselves; for example, a write followed by read from the same target location requires that commands are handled in order. This ordering is target dependent: in as much as a storage controller is simultaneously processing commands for multiple devices, the ordering need only be maintained for each individual target device.

Multiple command processing paths within a storage controller may execute commands at different speeds, as in a system with dedicated command processing hardware coupled to a general purpose processor. U.S. Pat. No. 8,438,321 (Elzur, et al) teaches an iSCSI control plane for handling iSCSI login and session layer traffic, and an iSCSI data plane containing iSCSI hardware acceleration. Elzur's iSCSI control plane may be considered the "slow path" and is implemented in an operating system driver, whereas the iSCSI data plane may be considered the "fast path" as it implements some of the iSCSI processing in hardware, prior to transferring processing back to the driver.

Commands handled by dedicated hardware, a "fast path," have very low command latencies while commands handled by a general purpose processor, the "slow path," have high command latencies. This creates a condition where commands dispatched to the fast path may execute prior to slow path commands already in process, causing out of order command execution. U.S. Pat. No. 9,122,401 (Zaltsman, et al.) teaches enqueuing memory commands for processing and then inserting barrier commands into selected queues to enforce command ordering.

In a storage controller optimized for low latency, enqueuing commands for reordering is not practical, since the very nature of command queues increases processing latency, even if queues contain only one command. The independent nature of multiple paths and requirements for low latency command processing therefore precludes command reordering at the storage target, blocking commands, or queuing of commands at the storage target interface.

BRIEF SUMMARY OF THE INVENTION

With parenthetical reference to corresponding parts, portions, steps or elements of the disclosed embodiment, merely for the purposes of illustration and not by way of limitation, the present invention provides a system and method within a storage controller for maintaining storage command order across multiple processing paths without command reordering at the storage target interface.

A storage router is provided for connection to a plurality of host systems and a plurality of target storage devices, for simultaneously processing a plurality of data storage commands and maintaining the order of said data storage commands. The storage router comprises a network interface (1) for receiving and responding to data storage commands generated by a host system; a hardware engine within the storage router for accelerating storage command processing, wherein the hardware engine comprises a frame correlation engine (2); a plurality of target storage interfaces (8) with unequal command processing latencies; a plurality of target storage devices associated with the target storage interfaces, wherein the target storage devices have associated storage commands; an acceleration gate (15) within the storage router in communication with the frame correlation engine (2). In certain aspects, the acceleration gate comprises: (a) an array containing target device IDs and command counts for each of the target storage interfaces; (b) logic for traversing the array in order to retrieve the command count for the target device ID; and (c) logic for incrementing and decrementing command counts. In other aspects, the acceleration gate is configured to communicate the number of outstanding storage commands on each of the target storage devices with an associated target storage interface; and in another aspect the acceleration gate (15) is configured such that storage commands are automatically routed to the target storage interface with the lowest command processing latency and a nonzero target storage device count. In one aspect, the acceleration gate (15) tracks the acceleration gate count of data storage commands in flight on each of said target storage interfaces on a per-target-storage-device basis.

In one aspect of the invention, target storage interfaces are prioritized in order of nominal command processing latency such that the target storage interfaces with lower latency are assigned higher priority. In certain embodiments, the acceleration gate may omit command counts for the lowest latency target storage interface.

In another aspect, the data storage commands are routed to the target storage interface with the lowest nominal command processing latency if the number of outstanding storage commands for said target storage device on all other storage interfaces is zero. Target storage devices may be configured to process the iSCSI commands in-order, and target storage interfaces with higher command latencies may delay the execution of data storage commands until interfaces with lower command latencies are idle.

In one embodiment, one of the target storage interfaces is a general-purpose microprocessor. In certain aspects, the general-purpose microprocessor updates the applicable acceleration gate count of data storage commands when data storage command errors have occurred on one of the target storage interfaces. In another, the general-purpose microprocessor updates the applicable acceleration gate count of data storage commands when data storage commands have been aborted by the network interface.

The hardware engine within the storage router may also include a TCP frame dissector configured to receive one or more TCP packets from the frame correlation engine, for splitting TCP packets for delivery to an iSCSI command engine or SCSI command engine; and a SCSI command engine configured to receive SCSI command information from the TCP frame dissector, for controlling flow of one or more commands, data or status to a storage interface.

In another embodiment, the acceleration gate within the storage comprises: (a) an array containing command counts for each of the target storage interfaces; (b) logic for traversing the array in order to retrieve the command count; and (c) logic for incrementing and decrementing command counts.

A system for simultaneously processing a plurality of data storage commands and maintaining the order of said data storage commands is also provided. The system comprises a host system; a plurality of storage devices; and a storage router comprising: (a) a network interface for receiving and responding to data storage commands generated by said host system; (b) a hardware engine within the storage router for accelerating storage command processing, said hardware engine comprising a frame correlation engine; (c) a plurality of target storage interfaces; (d) a plurality of target storage devices associated with said target storage interfaces, said target storage devices having associated storage commands; and (e) an acceleration gate within the storage router in communication with said frame correlation engine. In certain aspects, the acceleration gate tracks the acceleration gate count of data storage commands in flight on each of the target storage interfaces, and the frame correlation engine scans said acceleration gate for the acceleration gate count.

BRIEF DESCRIPTION OF THE DRAWINGS

FIG. 1 illustrates components used for a write operation in a system with fast and slow paths, along with data flow from a network interface to a storage interface.

FIG. 2 illustrates components used for a read or status operation in a system with fast and slow paths, along with data flow from the storage interface to a network interface.

FIG. 3 illustrates the logic flow of a frame correlator using an acceleration gate in an illustrative embodiment.

FIG. 4 illustrates the logic flow of a TCP dissector in an illustrative embodiment.

FIG. 5 illustrates the logic flow of an iSCSI command engine in an illustrative embodiment.

FIG. 6 illustrates the logic flow of the SCSI command engine in an illustrative embodiment.

FIG. 7 illustrates the logic flow of the TCP composer in an illustrative embodiment.

FIG. 8 is a diagram of the connection descriptor in an illustrative embodiment.

FIG. 9 is a diagram of the states of a connection in an illustrative embodiment.

FIG. 10 is a representative SCSI Descriptor (ACB) in an illustrative embodiment.

FIG. 11 is representative of acceleration gate data storage in one embodiment of the system that supports 'n' targets.

FIG. 12 is a flowchart showing completion of a command on a high latency path in one embodiment of the system.

DESCRIPTION OF THE PREFERRED EMBODIMENTS

At the outset, it should be clearly understood that like reference numerals are intended to identify the same elements, portions or steps consistently throughout the several drawing figures, as such elements, portions or surfaces may be further described or explained by the entire written specification, of which this detailed description is an integral part. Unless otherwise indicated, the drawings are intended to be read together with the specification, and are to be considered a portion of the entire written description of this invention. The following description is presented to enable any person skilled in the art to make and use the inventions claimed herein. Various modifications to the disclosed embodiments will be readily apparent to those skilled in the art.

Referring now to the drawings, and more particularly to FIG. 1, the narrow lines indicate the transfer of control information whereas the thick arrows show the flow of storage data through the mechanism. In this example Write operation, the host interface 1 accepts Ethernet frames and transfers them, with headers intact, to the incoming frame buffers 3. The frame correlator 2 scans the Ethernet and TCP/IP headers and compares them with entries in the initiator database 6. The initiator database is composed of an array of connection descriptors 14 which contain connection identification information such as Ethernet source and destination addresses, IP source and destination addresses and TCP source and destination port numbers, as described in the example connection descriptor in FIG. 8. The connection descriptor may store more or less information than that described in FIG. 8, however, or have the information represented in a different order. Persons of ordinary skill in the art will recognize that certain configurations of the command descriptor will favor execution speed over space, and others will favor space optimization. For example, if the NIC did not segregate flows based on queue pairs and ports, the first two fields in FIG. 8 could be a hardware assigned connection ID. Also, the ordering of the fields in the connection descriptor of FIG. 8 are arbitrary. The BHS could be held in a separate cache with the connection descriptor containing a reference to the cache entry. Or, the fields in the BHS cache could be rearranged if a hardware designer found it useful, for example. A connection descriptor also holds state information about the connection, including TCP sequence numbers, iSCSI sequence numbers and expected data length and offset for the current SCSI command. The connection descriptor may contain a reference to a SCSI Descriptor (ACB) 12, which holds parameters specific to the processing of a SCSI command, as shown in the example in FIG. 10. The ACB may store more or less information than that described in FIG. 10, however, or have the information represented in a different order. For example, in one example, command direction is determined from the SCSI CDB instead of being held in a separate field, and in another, sense data is stored outside of the ACB in a data buffer pointed to by buffer address instead of being buffered in the ACB directly. In another example, the frame correlator uses a multibit comparator to simultaneously compare physical port number and queue pair number (QPN) of each connection descriptor with the physical port number and QPN of the received frame. Once a matching connection is found, the frame information, along with the connection descriptor index, is passed to the TCP dissector 5.

In this illustration, the general purpose processor, with its high command processing latency, is the slow path and the protocol engines are the fast path. While this embodiment shows slow path command entered into an off ramp queue for forwarding to the general purpose processor the queue is not required to maintain command order. The command ordering mechanism described herein is still considered queue-less.

The TCP dissector 5 uses the state held by the connection descriptor to determine whether the frame information can be handled by the protocol engines 9, 10, 11. If it cannot be handled, the frame with header and data are funneled to the off ramp queue 4, which signals the processor interface 13 that an exception in processing has occurred. If the processor needs to be involved in the handling of this frame the headers and data are funneled to the off ramp queue 4, which signals the processor interface 13 that an exception in processing has occurred. The off ramp queue 4 generally handles (and the protocol engines of the preferred embodiment, therefore, do not handle) iSCSI PDUs that do not contain valid SCSI commands. PDU opcodes such as Login, Logout, Text Messages and iSCSI NOP are not SCSI commands. The off ramp queue 4 may also handle SCSI commands that do not contain large volumes of storage data such as SCSI inquiry, read capacity, mode sense and mode select, reserve and release commands, read and write buffer commands, etc.

The system in a preferred embodiment contains an acceleration gate. The acceleration gate is an array of memory elements, each containing a target id (LUN) and a gate count, plus logic for traversing the array in order to retrieve the gate count for an associated LUN. The acceleration gate also contains logic for incrementing and decrementing the gate count for an associated LUN and a slave interface for communicating with other components in the system. The acceleration gate, having a gate count for each LUN, therefore contains the number of outstanding commands on the slow path on a per-target-storage-device basis.

In order to maintain command ordering the frame correlator 2 in a preferred embodiment scans the acceleration gate 15 for the LUN contained in the ACB and retrieves the slow path gatecount. If the gate count is nonzero the frame correlator funnels the command to the off ramp queue 4. looks to the command gate and increments the slow path gate count stored in the acceleration gate 15 for that LUN. The acceleration gate could also be indexed by an internally generated target device ID, bus ID or any other information that uniquely identifies the target in question.

As commands are placed on the off ramp queue the frame correlator 2 increments the gate count in the acceleration gate 15 for the target device referenced by the command. In a preferred embodiment, only SCSI commands increment the gate count for a particular device.

Once the TCP dissector 5 has determined that the frame information is to be handled by the protocol engines, it strips the frame headers, then splits the data into pieces destined for one of the protocol engines 9, 10, 11. Frame data containing the iSCSI Basic Header Segment (BHS) is cached in the command descriptor and passed to the iSCSI Command Engine 9. A reference to storage data is passed to the copy engine 11. All protocol engines 9,10,11 also have access to the current connection descriptor.

The iSCSI command engine 9 performs BHS validation. If the BHS describes the beginning of a new SCSI command the iSCSI command engine 9 retrieves a SCSI descriptor (ACB) 12 from a pre-allocated pool of descriptors. A reference to the ACB is stored in the connection descriptor 14 for use by the SCSI command engine 10 and copy engine 11.

If the BHS describes the continuation of an outstanding command the iSCSI command engine 9 finds the associated ACB 12 and updates the ACB's state information to reflect the new BHS.

The SCSI command engine 10 directs the flow of the ACB 12 through the SCSI command processing. When handling a SCSI Write command, the SCSI command engine 10 uses information stored in the ACB 12 to determine if all of the data has been received for the command. If not, the SCSI command engine 10 sends the ACB 12 to the TCP composer to request the remaining data. If the ACB 12 indicates that the data has been written to the storage device, the SCSI command engine 10 translates the status returned by the storage interface 8 into status conformant to SCSI standards and notifies the iSCSI command engine 9 of the completion. The iSCSI command engine 9 writes the proper iSCSI header information into the ACB 12, references the connection descriptor 14 in the ACB 12 and updates the connection descriptor's 14 state.

The copy engine 11 copies storage data from the frame into the data memory 7 using buffer location, offset and length information in the ACB. Once all of the frames have been received and copied into the data memory 7 the storage interface 8 is notified that there is a complete SCSI Write command ready for transfer to the storage medium. By copying the data, the copy engine 11 frees up frame buffers for reuse and coalesces all the data into a single block of data memory, making the transfer to the storage interface more efficient.

When more data is required for a SCSI Write command, the TCP composer 15 uses the information in the command descriptor and the ACB 12 to build a R2T PDU to send to the host via the Host interface 1 (NIC). At the completion of the SCSI Write command, the TCP composer 15 uses the information in the command descriptor to transmit the response to the host via the Host interface 1 (NIC).

Each of the protocol engines may have the ability to determine that a command requires exception handling. Exceptions can be iSCSI commands with invalid parameters, SCSI commands which do not transfer bulk data, etc. If an exception is detected each protocol engine has the ability to shunt frame information to the off ramp queue 4 in order to have the processor handle the exception. As commands are placed on the off ramp queue for exception handling, the gate count held in the acceleration gate for the referenced target device is incremented such than any subsequent commands to the target device are funneled to the off ramp path.

FIG. 2 shows an exemplary system which handles status and read data operations. In FIG. 2, the narrow lines indicate the transfer of control information whereas the thick arrows show the flow of storage data through the mechanism. The storage interface 201 stores a pointer to a SCSI Descriptor (ACB) 203 for each command. As data is read from the physical storage, the storage interface 201 transfers the data from the physical storage to the data memory 202. On command completion, status is written to the SCSI Descriptor (ACB) 203 associated with the storage command. The SCSI command engine 205 is notified of the command completion.

In FIG. 2, the SCSI command engine 205 translates the status returned by the storage interface 201 into status conformant to SCSI standards and notifies the iSCSI command engine 206 of the completion. The iSCSI command engine 206 updates the connection descriptor 207 with the iSCSI header for the command response along with a reference to any response data residing in the data memory 202, then notifies the TCP composer 214 of the response to be transmitted.

The TCP composer 214 uses the information in the command descriptor to transmit the response and data to the host via the Host interface 211 (NIC). This may entail the splitting of response data into individual Ethernet frames, each with its own header, or may make use of the large transmit offload capability available in many NICs.

Since TCP is a reliable protocol, depending on acknowledgment from the receiving side, the data memory 202 and response-specific connection information cannot be freed for reuse until the response and data have been acknowledged. The TCP dissector 209 may contain TCP ACK handling logic as part of its receive functionality in order to recognize and process TCP acknowledgement numbers. When transmitted data has been acknowledged, the TCP dissector 209 clears ACB 203 and connection descriptor 207 references to the data memory 202 and frees ACBs 203 for reuse.

In another aspect, the TCP dissector 209 may have TCP retransmit signaling consisting of a timer and TCP ACK logic in order to signal the TCP composer when a retransmit is necessary. The TCP composer 214 contains logic to retransmit iSCSI headers and data via the NIC 211 according to the requirements of the TCP protocol.

An additional capability of the TCP composer 214 may also be provided: the generation of TCP ACK numbers and zero-length ACK frames for transmission via the NIC 211. TCP ACK numbers are stored in the connection descriptor 207 for inclusion in TCP transmissions in accordance with the TCP protocol.

In another aspect, the SCSI command engine 205 may detect SCSI command errors that require additional handling via a general purpose processor. In that situation, the SCSI command engine 205 places a reference to the ACB 203 requiring extra processing into the storage interface 210 for handling by the general purpose processor. As commands are tagged for handling by the general purpose processor, the gate count held in the acceleration gate for the referenced target device is incremented.

Additionally, each component which interacts with ACBs 203 may have the capability of detecting ACBs 203 that have been aborted by SCSI task management functions. The reference to an ACB 203 for each aborted SCSI command is passed to the storage interface 210 for handling by the general purpose processor. In a preferred embodiment, aborted commands do not cause the gate count held in the acceleration gate for the referenced target device to be incremented since command order has been disrupted due to the abort.

The hardware engine described above may be capable of maintaining and/or configured to maintain at least 64 simultaneous TCP connections. In addition, the storage interface may be capable of maintaining and/or configured to maintain connections to 1024 or more storage devices.

Detailed Logic Flow—Frame Correlator

The frame correlator in FIG. 3 is responsible for matching a received TCP packet to an internal connection ID. When a TCP packet is received 301 the Initiator database is scanned 302 based on the packet's queue pair number (QPN) and physical port number. A connection ID is generated by the scanner. If the connection ID is valid 303, the acceleration gate for the associated target is scanned 304. If the target's gate count is zero 305 the context is loaded from the initiator database 306, the TCP header is read from the packet frame buffer 307 and sent to the TCP dissector 308. If the connection ID generated is not valid or the target gate count is nonzero the packet is sent 309 to the processor interface 13, 204 for handling by the general purpose processor. TCP packets handed to the general purpose processor are not SCSI commands and do not affect the acceleration gate's gate count for any target device.

Detailed Logic Flow—TCP Dissector

The TCP dissector in FIG. 4 splits incoming TCP packets into pieces to be handled by the various protocol engines. Once a TCP packet is received, if the connection state is FLUSHING 402 the packet is discarded 406 and the frame buffer is returned to the free pool 407. If not in FLUSHING state the packet sequence number is checked against the sequence number stored in the connection descriptor 403. If the sequence number indicates an out of order TCP packet the packet is placed on the connection's out of order queue 408 and the TCP dissector waits to process the next packet 401.

If the TCP dissector detected a valid, in-order TCP packet the TCP composer is signaled to generate a TCP acknowledgment 404 and the TCP dissector takes further action based on connection state 405,409,418.

For a connection in WAIT_FOR_DMA_CMPLT state 405, the packet is moved to the connection's out of order queue for further processing 408.

For a connection in WAIT_FOR_BHS state 409 the TCP dissector transfers the number of bytes remaining in the current BHS into the connection descriptor BHS cache. If the bytes left in the packet does not complete the BHS 411 the frame buffer is returned to the free pool 407 and the TCP dissector waits to process the next packet. If an entire BHS has been received, the TCP dissector pauses to wait for the iSCSI command engine to validate the BHS 413. Validation in the iSCSI command engine occurs simultaneous to TCP dissector processing due to the engines' concurrent access to the BHS cache in the connection descriptor. Once validated if there are bytes remaining in this iSCSI PDU 414 the connection state is set to WAIT_FOR_DATA 416 and the packet is sent to the copy engine 417. Since there may be more than one BHS in a single TCP packet the packet is checked for additional BHS data 415 and a new BHS is generated, if necessary 410.

For a connection in WAIT_FOR_DATA state 418 the packet segment is sent to the copy engine based on the remaining count in the current BHS 419. If all PDU data has been acquired the connection state is reset to WAIT_FOR_BHS 422. Any remaining data in the TCP packet is scanned for the new BHS 410. Multiple iterations of BHS and/or data handling are handled by the TCP dissector. Each of the foregoing connection states is also described in FIG. 9.

Detailed Logic Flow—iSCSI Command Engine

The iSCSI command engine in FIG. 5 handles iSCSI status and/or data to be returned from the connected storage to the host as well as new commands from the host to the storage. Status and/or data to be returned will be sent to the iSCSI command engine as an ACB whereas new commands will be formatted as a BHS.

The iSCSI command engine waits for a BHS or ACB 501. If an ACB is received 502 the iSCSI command engine creates an iSCSI header for the command response 503 and sends the ACB to the TCP composer 504.

If a new iSCSI BHS is received the opcode is validated 505. Invalid opcodes are sent to the processor interface 13,204 for error handling 506. Valid opcodes are checked for iSCSI data out opcode, which requires special handling 507. If the connection is in BYPASS state 508 the data out BHS is sent to the processor interface 13,204. If bypass mode is not enabled the BHS expected transfer length and AHS lengths are validated 510. A data out which fails these is sent 518 to the processor interface 13. If the validation passes the iSCSI command engine returns the packet to the TCP dissector 5 for further processing 517.

A BHS that is not an iSCSI data out has the PDU command sequence number validated 509. A BHS that fails sequence number validation is sent to the processor interface 204 for error handling 506. If the connection state is BYPASS or the BHS opcode is not meant to be accelerated 511 the BHS will be sent 513 to the processor interface 204.

iSCSI commands may require a handshake between the host and the target, called a ready-to-transfer PDU (R2T). If additional data buffering is required for read or write 512 the iSCSI command engine acquires a buffer from data memory 514. SCSI command information is then transferred to the ACB 515 and the ACB is sent to the SCSI command engine 516. The packet is then returned to the TCP dissector for further processing 517.

Detailed Logic Flow—SCSI Command Engine

The SCSI command engine illustrated in FIG. 6 controls the flow of commands, data and status to the storage interface. The SCSI command engine waits for an ACB to process 601. Write commands (data out from the initiator) contain an iSCSI data phase prior to starting the command on the SCSI interface, so processing in the SCSI command engine is split into read/nondata and write processing. The ACB's command direction is checked 602. Reads are checked whether the command is new (generated by the iSCSI engine) or a completion (from the storage interface) 603. New commands are sent 604 to the storage interface 201. Write commands are likewise checked for new or completion 610. If the write command is new the ACB is checked to see if all of the data has been received by the TCP dissector 611. If there is data required the SCSI command sends the ACB to the TCP composer 612. The TCP composer will create an R2T to send to host to request the remaining data. If all data has been received the ACB is sent 613 to the storage interface 8.

Command completions from the storage interface are checked for error status 605. If no error the ACB is forwarded to the iSCSI command engine for completion 606. If an error did occur and the error can be handled by the acceleration a SCSI status is written to the ACB 608 and the ACB is forwarded to the iSCSI command engine for completion 606. Complex errors which are not handled by the SCSI command engine are sent 609 to the storage interface 210.

Detailed Logic Flow—TCP Composer

The TCP Composer illustrated in FIG. 7 generates Ethernet, TCP and IP headers for network packets to be transmitted. When an ACB is received by the TCP composer 701 the connection descriptor is read from the initiator database 702. The NIC 1,211 is scanned to determine if there is room in its output queue 703. If there is no room the ACB is placed on the TCP composer's wait queue 704.

If a Ready to Transfer iSCSI message (R2T) is required for this ACB 705 the required headers are built 706, 707. The R2T PDU is created 708 and the TCP packet is enqueued to the NIC 709. The ACB is then placed on the retransmission queue 710.

If a R2T is not required 705 the ACB is checked to see if an iSCSI data in PDU is required 711 along with status. If a data in PDU is required the buffer address and transfer length from the ACB are used to configure the data transfer 712. The sense data, if any, is read from the sense data buffer in the ACB. The required headers are built 713,714 and the transfer is enqueued to the NIC as a large send offload 715. The ACB is then placed on the retransmission queue 710.

If a R2T is not required 705 and the ACB does not need a data in response sent 711 the sense data is read from the sense data buffer in the ACB 716. The required headers are built 717,718 and the iSCSI status PDU is created using the sense data from the ACB 719. The TCP packet is enqueued to the NIC 720 and the ACB is placed on the retransmission queue 710.

The foregoing system and method may be implemented in a field-programmable gate array (FPGA) such as an Intel® Arria 10. The FPGA is connected to a NIC via the PCIe bus and communicates using methods defined by the NIC vendor. However, the system and method may be implemented in an ASIC or custom logic.

The acceleration gate stores a gate count for each target id exposed to the host interface, as shown in the preferred embodiment in FIG. 11. As storage commands are routed to the slow path, the gate count is incremented. Commands may be routed to the slow path based on command type, for example not a read or write command, due to errors in command processing, or because the gate count for the target is nonzero when a new command is received. The acceleration gate provides write access to the frame correlator, TCP composer and protocol engines for incrementing and decrementing the gate count associated with a particular target id. The acceleration gate in certain embodiments also provides read access to the frame correlator and TCP composer for querying the gate count associated with a particular target id.

FIG. 12 illustrates storage command completion for a command on the high latency path in a preferred embodiment of the invention. When an ACB from the slow path is passed to the TCP composer to generate a command response 1201 the ACB is queried for target id (LUN) 1202. The acceleration gate is queried for the gate count 1203. If the gate count is already 0 zero 1204, a double completion has occurred and no change is made to the gate count for the referenced LUN 1206. Otherwise the gate count for the referenced LUN is decremented 1205. Once the gate count reaches zero, new commands received on the host interface are eligible for accelerated processing to the target.

In another embodiment of the invention the command completion on a slower path, such as a general purpose processor, may be handled by the processor itself instead of the TCP composer. In this case writes to the acceleration gate are implemented as atomic writes, and atomic read/write access to the acceleration gate is granted to the general purpose processor for reading and decrementing the gate count.

The acceleration gate disclosed herein is not limited to two dissimilar paths. In the case of more than two paths, the acceleration gate may keep a gate count for each path. The paths are validated in order of nominal latency, with the slowest path first. If the slowest path has a nonzero gate count for a given target, all traffic is routed to the slowest path until traffic completes and the path gate count reaches zero. Subsequent storage commands to said target are then routed to the next slowest path holding a nonzero gate count for said target in order to preserve ordering.

The present invention contemplates that many changes and modifications may be made. Therefore, while an embodiment of the improved system and method has been shown and described, and a number of alternatives discussed, persons skilled in this art will readily appreciate that various additional changes and modifications may be made without departing from the spirit of the invention, as defined and differentiated by the following claims.

What is claimed is:

1. A storage router for connection to a plurality of host systems and a plurality of target storage devices, for simultaneously processing a plurality of data storage commands and maintaining the order of said data storage commands, comprising:
    a network interface for receiving and responding to data storage commands generated by a host system;
    a hardware engine within the storage router for accelerating storage command processing, said hardware engine comprising a frame correlation engine;
    a plurality of target storage interfaces with unequal command processing latencies;
    a plurality of target storage devices associated with said target storage interfaces, said target storage devices having associated storage commands;
    an acceleration gate within the storage router in communication with said frame correlation engine, said acceleration gate comprising: (a) an array containing target device IDs and command counts for each of said target storage interfaces; (b) logic for traversing the array in order to retrieve said command count for said target device ID; and (c) logic for incrementing and decrementing said command counts;
    said acceleration gate configured to communicate the number of outstanding storage commands on each of said target storage devices with an associated target storage interface; and
    said acceleration gate configured such that storage commands are automatically routed to the target storage interface with the lowest command processing latency and a nonzero target storage device count; wherein said target storage interfaces with higher command latencies delay the execution of said data storage commands until interfaces with lower command latencies are idle.

2. The storage router of claim 1, wherein said target storage interfaces are prioritized in order of nominal command processing latency such that the target storage interfaces with lower latency are assigned higher priority.

3. The storage router of claim 1, wherein said acceleration gate omits command counts for the lowest latency target storage interface.

4. The storage router of claim 1, wherein said data storage commands are routed to the target storage interface with the lowest nominal command processing latency if the number of outstanding storage commands for said target storage device on all other storage interfaces is zero.

5. The storage router of claim 1, wherein said acceleration gate tracks the acceleration gate count of data storage commands in flight on each of said target storage interfaces on a per-target-storage-device basis.

6. The storage router of claim 1 wherein said target storage device is configured to process the iSCSI commands in-order.

7. The storage router of claim 1 wherein one of said target storage interfaces is a general-purpose microprocessor.

8. The storage router of claim 7 wherein said general-purpose microprocessor updates the applicable acceleration gate count of data storage commands when data storage command errors have occurred on one of said target storage interfaces.

9. The storage router of claim 7 wherein said general-purpose microprocessor updates the applicable acceleration gate count of data storage commands when data storage commands have been aborted by the network interface.

10. The storage router of claim 1 wherein said hardware engine further comprises:
    a TCP frame dissector configured to receive one or more TCP packets from the frame correlation engine, for splitting TCP packets for delivery to an iSCSI command engine or SCSI command engine; and
    a SCSI command engine configured to receive SCSI command information from the TCP frame dissector, for controlling flow of one or more commands, data or status to a storage interface.

11. A storage router for connection to a plurality of host systems and a plurality of target storage devices, for simultaneously processing a plurality of data storage commands and maintaining the order of said data storage commands, comprising:
    a network interface for receiving and responding to data storage commands generated by a host system;
    a hardware engine within the storage router for accelerating storage command processing, said hardware engine comprising a frame correlation engine;
    a plurality of target storage interfaces with unequal command processing latencies;
    a plurality of target storage devices associated with said target storage interfaces;
    an acceleration gate within the storage router in communication with said frame correlation engine, said acceleration gate comprising: (a) an array containing command counts for each of said target storage interfaces; (b) logic for traversing the array in order to retrieve said command count; and (c) logic for incrementing and decrementing said command counts;
    said acceleration gate configured to communicate the number of outstanding storage commands on each of said target storage devices with an associated target storage interface; and
    said acceleration gate configured such that storage commands are automatically routed to the target storage interface with the lowest command processing latency and a nonzero target storage device count; wherein said target storage interfaces with higher command latencies delay the execution of said data storage commands until interfaces with lower command latencies are idle.

12. The storage router of claim 11, wherein said acceleration gate command count array is ordered such that each array element describes said command count for a predetermined target storage device.

13. The storage router of claim 11, wherein said acceleration gate omits command counts for the lowest latency target storage interface.

14. The storage router of claim 11, wherein said target storage interfaces are prioritized in order of nominal command processing latency such that the target storage interfaces with lower latency are assigned higher priority.

15. The storage router of claim 11, wherein said acceleration gate omits command counts for the lowest latency target storage interface.

16. The storage router of claim 11, wherein said data storage commands are routed to the target storage interface with the lowest nominal command processing latency if the number of outstanding storage commands for said target storage device on all other storage interfaces is zero.

17. The storage router of claim 11, wherein said acceleration gate tracks the acceleration gate count of data storage commands in flight on each of said target storage interfaces on a per-target-storage-device basis.

18. The storage router of claim 11, wherein said target storage device is configured to process the iSCSI commands in-order.

19. A system for simultaneously processing a plurality of data storage commands and maintaining the order of said data storage commands, comprising:

a host system;
a plurality of storage devices;
a storage router comprising:
(a) a network interface for receiving and responding to data storage commands generated by said host system;
(b) a hardware engine within the storage router for accelerating storage command processing, said hardware engine comprising a frame correlation engine;
(c) a plurality of target storage interfaces;
(d) a plurality of target storage devices associated with said target storage interfaces, said target storage devices having associated storage commands; and
(e) an acceleration gate within the storage router in communication with said frame correlation engine, said acceleration gate comprising: (i) an array containing target device IDs and command counts for each of said target storage interfaces; (ii) logic for traversing the array in order to retrieve said command count for said target device ID; and (iii) logic for incrementing and decrementing said command counts;
wherein said acceleration gate tracks the acceleration gate count of data storage commands in flight on each of said target storage interfaces and said frame correlation engine scans said acceleration gate for said acceleration gate count;
wherein said acceleration gate is configured and arranged for communicating the number of outstanding storage commands on each of said target storage devices with an associated target storage interface; and
wherein said acceleration gate is configured and arranged such that storage commands are automatically routed to the target storage interface with the lowest command processing latency and a nonzero target storage device count; and wherein target storage interfaces with higher command latencies delay the execution of said data storage commands until interfaces with lower command latencies are idle.

* * * * *